United States Patent
Bird et al.

(10) Patent No.: US 7,568,235 B2
(45) Date of Patent: Jul. 28, 2009

(54) CONTROLLING DATA ACCESS USING SECURITY LABEL COMPONENTS

(75) Inventors: Paul Miller Bird, Markham (CA); Walid Rjaibi, Markham (CA)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 11/036,839

(22) Filed: Jan. 15, 2005

(65) Prior Publication Data

US 2006/0059567 A1 Mar. 16, 2006

(30) Foreign Application Priority Data

Feb. 20, 2004 (CA) .................................. 2459004

(51) Int. Cl.
*H04L 9/32* (2006.01)
*H04L 9/00* (2006.01)
*G06F 17/30* (2006.01)
*G06F 7/04* (2006.01)
*H04K 1/00* (2006.01)

(52) U.S. Cl. ................ 726/27; 726/6; 726/28; 713/182

(58) Field of Classification Search .................... 726/6, 726/27, 28; 713/182
See application file for complete search history.

(56) References Cited

U.S. PATENT DOCUMENTS

| 6,185,551 | B1 | 2/2001 | Birrell et al. ................... 707/3 |
| 6,526,398 | B2 | 2/2003 | Wolff et al. .................... 707/1 |
| 6,606,681 | B1 | 8/2003 | Uzun ........................... 711/108 |
| 6,981,265 | B1 * | 12/2005 | Rees et al. ................... 719/313 |
| 2001/0013096 | A1 | 8/2001 | Luckenbaugh et al. ...... 713/154 |
| 2004/0015701 | A1 * | 1/2004 | Flyntz ........................ 713/182 |

* cited by examiner

*Primary Examiner*—Kambiz Zand
*Assistant Examiner*—Aubrey H Wyszynski
(74) *Attorney, Agent, or Firm*—Patterson & Sheridan, LLP

(57) ABSTRACT

A method that controls user access to the stored data elements using security label components is disclosed. Each stored data element is associated with a set of data security label components, and each user is associated with a set of user security label components. The method receives a user request to access the stored data elements, compares the set of user security label components to the set of data security label components associated with the users, and based on the comparison result, determines whether or not to permit access to the stored data.

19 Claims, 14 Drawing Sheets

FIG. 2

| LABEL SET 118 (TYPES OF ACCESS PARAMETERS) | | |
|---|---|---|
| ACCESS PARAMETER TYPE_1 | ACCESS PARAMETER TYPE_2 | ACCESS PARAMETER TYPE_3 |
| LEVEL | COMPARTMENT | OWNER |
| TOP SECRET | ARMY | MAINTENANCE |

LABEL COMPONENTS 202

LABEL COMPONENT NAMES 204

ROW 206 EXAMPLES OF ELEMENTS OF LABEL COMPONENTS 202

FIG. 3

CLASSIFIED TABLE 120 (TABLE 120 CONTAINING CLASSIFIED DATA ELEMENTS)

| 302 DATA ELEMENT IDENTIFIER | 303 CLASSIFIED DATA ELEMENT | 304 DATA ELEMENT ACCESS REQUIREMENTS TO BE COMPARED AGAINST USER ACCESSIBILITY INDICATORS | | |
|---|---|---|---|---|
| | | ROW LABELS 306 DATA ELEMENT ACCESS COMPONENT TYPE_1 (LEVEL) | ROW LABELS 308 DATA ELEMENT ACCESS REQUIREMENT TYPE_2 (COMPARTMENT) | ROW LABELS 310 DATA ELEMENT ACCESS REQUIREMENT TYPE_3 (OWNER) |
| 1 | PLAN_A | TOP SECRET | ARMY | MARINES |
| 2 | PLAN_B | SECRET | NASA | RESEARCH |
| 3 | PLAN_C | CLASSIFIED | AIR FORCE | MAINTENANCE |
| 4 | PLAN_D | DECLASSIFIED | EMBASSY | LIBRARY |

| USER ACCESS TABLE 122 | | | |
|---|---|---|---|
| COLUMN 402 USER IDENTIFIER | 404 PREDETERMINED USER ACCESS ABILITY INDICATORS TO BE COMPARED AGAINST DATA ELEMENT ACCESS REQUIREMENTS | | |
| | COMPONENT 406 USER ACCESS ABILITY INDICATOR TYPE_1 (LEVEL) | COMPONENT 408 USER ACCESS ABILITY INDICATOR TYPE_2 (COMPARTMENT) | COMPONENT 410 USER ACCESS ABILITY INDICATOR TYPE_3 (OWNER) |
| WALID | TOP SECRET | ARMY, NASA | MARINES |
| BIRD | CLASSIFIED | NASA | RESEARCH |

| TESTS 124 | | |
|---|---|---|
| SET OF TESTS FOR COMPARING DATA ELEMENT ACCESS REQUIREMENTS AGAINST USER ACCESS ABILITY INDICATORS WHEN A USER DESIRES READ OR WRITE ACCESS TO TABLE 120 | | |
| 502<br>TEST IDENTIFIER | 504<br>TEST TYPE | 506<br>TEST DETAILS |
| TEST_1 | READ ACCESS | IS USER ACCESS ABILITY INDICATOR TYPE_1 GREATER THAN OR EQUAL TO DATA ELEMENT ACCESS REQUIREMENT TYPE_1? |
| TEST_2 | READ ACCESS | DOES DATA ELEMENT ACCESS REQUIREMENT TYPE_2 MATCH WITH USER ACCESS ABILITY INDICATOR TYPE_2? |
| TEST_3 | WRITE ACCESS | IS DATA ELEMENT ACCESS REQUIREMENT TYPE_1 GREATER THAN OR EQUAL TO USER ACCESS ABILITY INDICATOR TYPE_1? |
| TEST_4 | WRITE ACCESS | DOES USER ACCESS ABILITY INDICATOR TYPE_2 MATCH WITH DATA ELEMENT ACCESS REQUIREMENT TYPE_2? |

508 → TEST_1
510 → TEST_2
512 → TEST_3
514 → TEST_4

CONTROLLING DATA ACCESS USING SECURITY LABEL COMPONENTS

PRIORITY CLAIM

The present application claims the priority of Canadian patent application, Serial No. 2,459,004, titled "Method and System to Control Data Access Using Security Label Components," which was filed on Feb. 20, 2004, and which is incorporated herein by reference.

FIELD OF THE INVENTION

The present invention relates to access control of stored data, and more specifically to a method, a system, and a computer program product to control data access using security label components.

BACKGROUND OF THE INVENTION

In general, access control mechanisms based on labels do not address the requirements from application domains where the label structure and the label access rules do not necessarily match those specific to Multilevel Security (MLS).

Access control regulates the reading, changing, and deleting of objects stored on a computer system. Access control further prevents the accidental or malicious disclosure, modification, or destruction of such objects. Fundamental types of access control comprise discretionary access control (DAC), role-based access control (RBAC), and mandatory access control (MAC). DAC permits the granting and revoking of access privileges to be left to the discretion of the individual users. RBAC does not allow users to have discretionary access to objects. Instead, access permissions are associated with roles; users are made members of appropriate roles. MAC, as defined in the Trusted Computer Security Evaluation Criteria (TCSEC) is "a means of restricting access to objects based on the sensitivity (as represented by a label) of the information contained in the objects and the formal authorization (i.e., clearance) of subjects to access information of such sensitivity"

One implementation of MAC is Multilevel Security (MLS) that has typically been available primarily on computer and software systems deployed at sensitive government organizations such as the intelligence services or the military.

An MLS model is stated in terms of objects and subjects. An object is a passive entity such as a data file, a record, or a field within a record. A subject is an active process that can request access to objects. The object is assigned a classification, and the subject is assigned a clearance. Classifications and clearances are collectively referred to as access classes or labels. A label is a piece of information that comprises a hierarchical component and a set of unordered compartments.

The hierarchical component specifies the sensitivity of the data. For example, a military organization might define levels top secret, secret, confidential, and unclassified. The compartments component is non-hierarchical and is used to identify areas that describe the sensitivity or category of the labeled data. For example, a military organization might define compartments NATO, nuclear, and army. Labels are partially ordered in a lattice as follows: given two labels L1 and L2, L1>=L2 if and only if the hierarchical component of L1 is greater than or equal to that of L2, and the compartment component of L1 includes the compartment component of L2. L1 is said to "dominate" L2.

MLS restricts data accesses through a simple security property and a *-property (pronounce "the star property"). The simple security property allows a subject read access to an object if and only if the subject's label dominates the object's label. The *-property allows a subject write access to an object if and only if the object's label dominates the subject's label. The *-property prevents subjects from declassifying information.

Even though MLS has traditionally been a requirement of some sensitive government organizations, such as the intelligence services or the military, the ever-increasing customer demand for higher security has made MLS attractive for commercial software products. For example, in certain implementations, the DBMS controls access to database table rows based on a label contained in the row and the label associated with the database user attempting the access. The drawbacks of such implementations comprise a fixed label structure and fixed access rules.

MLS fixes the label structure of a hierarchal component and a set of unordered compartments. Thus, the labels cannot be used for other types of applications to provide fine-grained access control to database table rows. For example, in certain banking applications, a label represents a geographical location, which is a single component and is not hierarchal. MLS further fixes access rules. Access to database table rows is governed by the simple security property and the *-property. Thus, this form of access control based on labels cannot be used for other purposes. For example, banking applications have different requirements for the label structure and for the label access rules.

Although this technology has proven to be useful, it would be desirable to present additional improvements. Existing access control systems based on labels strictly implement the MLS semantics. These conventional access control systems fail to address the label requirements from application domains where the label structure and the label access rules do not necessarily match those described in MLS. Moreover, these existing solutions cannot be used to enforce privacy policies. Generally, a privacy policy indicates for which purposes an information is collected, whether or not the collected information will be communicated to others, and for how long the collected information is retained before it is discarded.

For example, a user should not be able to access a customer record for the purpose of sending that customer marketing information if that customer did not agree to receipt of such information. Access to privacy-sensitive data can be regarded as analogous to access to labeled data. In both cases, a tag is associated with the object being accessed and the subject accessing that object. The tag is a "purpose" in the case of the accessing privacy-sensitive data and a "label" in the case of the accessing labeled data.

However, existing access control solutions based on labels strictly implement the MLS semantics, and thus cannot be used to enforce privacy policies for the following reasons. Labels include a hierarchal component that is not applicable in the case of privacy. Furthermore, the MLS security properties do not apply in the context of privacy.

What is therefore needed is a system, a computer program product, and an associated method for a label-based access control (LBAC) solution that is capable of implementing the MLS semantics and of addressing the requirements from a variety of application domains, including MLS requirements. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for controlling data access using security label components. The present system provides, for a data processing system having memory for storing data elements, a method for directing the data processing system to control user access to the stored data elements.

Each stored data element is associated with a set of data security label components. Each user is associated with a set of user security label components. The present system comprises receiving a user request to access the stored data elements, comparing the set of user security label components against the set of data security label components associated with the users, and determining whether to permit access to the stored data responsive to the received user request based on results of the comparison.

The present system comprises a computer program product for directing a data processing system to control user access to data elements stored in memory of the data processing system. Each stored data element is associated with a set of data security label components. Each user is associated with a set of user security label components. The computer program product comprises a computer readable transport medium for transporting computer executable code to the data processing system. The computer executable code comprises computer executable code for receiving a user request to access the stored data elements, computer executable code for comparing the set of user security label components against the set of data security label components associated with the users, and computer executable code for determining whether to permit access to the stored data responsive to the received user request based on results of the comparison.

The present system comprises an access control system to be operatively coupled to a data processing system having memory for storing data elements. The access control system directs the data processing system to control user access to the stored data elements. Each stored data element is associated with a set of data security label components. Each user is associated with a set of user security label components. The access control system comprises means for receiving a user request to access the stored data elements, means for comparing the set of user security label components against the set of data security label components associated with the users, and means for determining whether to permit access to the stored data responsive to the received user request based on results of the comparison.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 2 is a table illustrating types of access parameters implemented by the access control system of FIG. 1;

FIG. 3 is a table illustrating data and table access parameters of the access control system of FIG. 1 for the database of FIG. 1;

FIG. 4 is a table illustrating a user access table in which user access parameters are associated by the access control system of FIG. 1 with users of the database of FIG. 1;

FIG. 5 is a table illustrating tests used by the access control system of FIG. 1 in comparing table access parameters against user access parameters for access to the database of FIG. 1;

DETAILED DESCRIPTION OF THE PREFERRED EMBODIMENTS

The following detailed description of the embodiments of the present invention does not limit the implementation of the embodiments to any particular computer programming language. The computer program product may be implemented in any computer programming language provided that the OS (Operating System) provides the facilities that may support the requirements of the computer program product. A preferred embodiment is implemented in the C or C++ computer programming language (or may be implemented in other computer programming languages in conjunction with C/C++). Any limitations presented would be a result of a particular type of operating system, computer programming language, or data processing system and would not be a limitation of the embodiments described herein.

Figure 1:
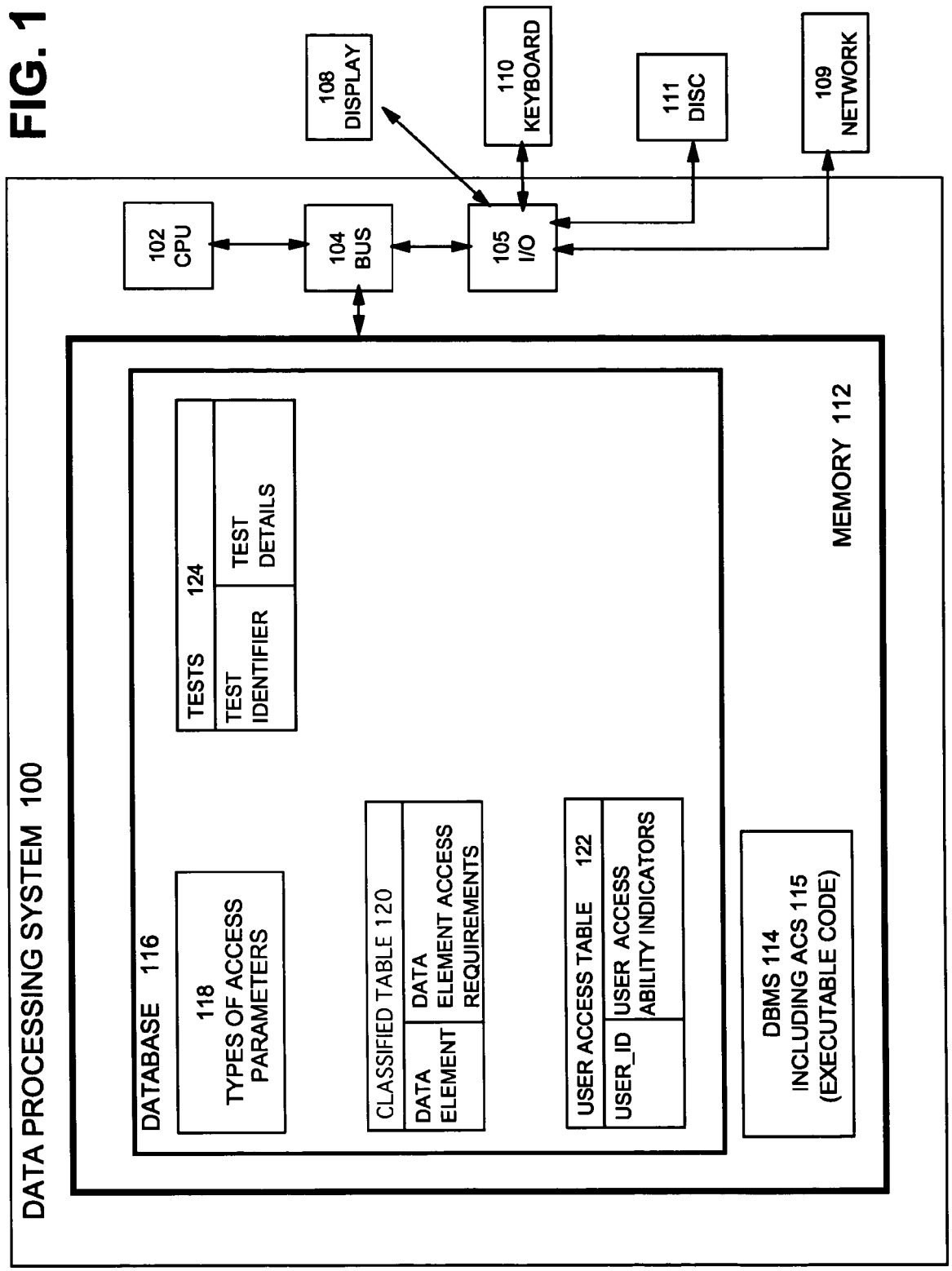
FIG. 1 is a schematic illustration of an exemplary database management system installed on a data processing system having memory storing a database in which an access control system (ACS) of the present invention can be used.

FIG. 1 portrays an exemplary overall environment in which a system and associated method for controlling data access using security label components (an access control system 115) according to the present invention may be used. The access control system 115 comprises a software programming code or a computer program product that is typically embedded within, or installed on a memory 112. Alternatively, system 10 can be saved on a suitable storage medium such as a diskette, a CD, a hard drive, or like devices.

A data processing system (DPS) 100 comprises a Central Processing Unit (CPU) 102 operatively coupled to a bus 104. Bus 104 is operatively coupled to I/O (Input/Output Interface Unit) 105 and coupled to memory 112. I/O 105 operatively couples bus 104 to a display unit 108, a keyboard/mouse (keyboard 110), a disc 111, and a network 109. Memory 112 may comprises a combination of many types of memory, such as RAM (Random Access Memory), ROM (Read Only Memory), and hard disk (not illustrated).

The memory 112 stores a database 116 and a database management system (DBMS) 114. The DBMS 114 comprises the access control system 115. However, the access control system 115 may operate independently of the DBMS 114 and there may be system calls transferred between the DBMS 114 and the access control system 115. The DBMS 114 and the access control system 115 comprise computer executable code that is executed by the CPU 102. The computer executable code is compiled from computer programmed instructions written in a high-level computer programming language (such as, for example, C++ or Java). The computer executable code is loaded to memory 112 by transferring the computer executable code from disc 111.

Disc 111 is a computer program product comprising a computer readable medium that is used to transport the computer executable code to the DPS 100 via I/O 105. Alternatively, the computer readable medium comprises a computer readable transport signal carried by network 109, the signal being used to transport the computer executable code to the DPS 100 via I/O 105. It will be appreciated that the computer executable code configures the DPS 100 (which is a general purpose machine) into a specifically configured machine that may be treated as comprising modules or mechanisms that achieve specific functions (these functions to be described below in more detail).

Generally, the computer executable code included in the access control system 115 directs CPU 102 to define security labels for data and users. Data security label components are found in types of access parameters 118. The data security label components are associated with each data element stored in a classified table 120. The access control system 115 also defines user security label components that are stored in a user access table 122. Each user security label component is associated with a user. The access control system 115 directs CPU 102 to determine whether the user, who submitted a request to access a data element, is granted access or is denied access to the data element based upon a comparison made between the user security label components and the data security label components. Tests 124 comprise these tests or rules for allowing user access to the data element.

The access control system 115 is used to control user access to stored data shown in classified table 120. Associated with the stored data are security label components. Associated with the users are user security label components. The access control system 115 configures a configurable security label structure that describes the security label components associated with the stored data and the users (the security label structure is described below in greater detail). The access control system 115 also defines label access rules to be associated with the configurable security label structure. The access control system 115 executes the defined label access rules to compare the security label components associated with the stored data against the security label components associated with the users. The access control system 115 determines whether to permit and to not permit user access to the stored data based on the outcome of the executed defined label access rules.

FIG. 2 is a table illustrating the types of access parameters used by the access control system 115 of FIG. 1, access parameters 118. These types of access parameters are a collection of security access parameters further referenced herein as a security label set label set 118 or label set 118. The label set 118 is a security label structure that comprises types of security access components (label components) 202, each associated with security access parameters such as label component names 204.

The label components label components 202 is a set of security access label components that are organized as a schema; the schema is the label set 118. As a table schema defines the set of columns that make up a data row, so the label set 118 represents a schema that defines a set of label components 202 that make up a security access label. The security access label is either associated with a data element stored in classified table 120 or associated with a user—as indicated in user access table 122. The label set 118 comprises security access rules that the access control system 115 uses to determine whether a user who is associated with a label, L_1, may be granted or may be denied access to a data element associated with a label, L_2. Further description for the access rules or tests is provided below. The security access rules (or tests) may be stored in a test table, tests 124 of FIG. 1.

A type of access parameter may be treated as one of the label components 202, each of which is associated with one of the label component names 204. The set of label components 202 is an entity that may be created, dropped, and altered by the access control system 115. The security label set 118 (to be associated with a data element or with a user) may include one or more of the label components 202. There may be types of the label components 202, such as for example a "set" type of the label components 202 and a "tree" type of the label components 202. There may be an ordered set type of the label components 202 and there may be an unordered set type of the label components 202.

In an ordered set type of the label components 202, the order in which element in a component appears is important: for example, the rank of a first element is higher than a rank of a second element, a rank of a second element is higher than a rank of a third element and so on (for one of the label components 202). An example of the types of components is indicated in row 206 of the label set 118, examples of elements of the label component 202.

A tree type of the label components 202 represents a hierarchy of an organization (such as a company for example). The tree type of the label components 202 may be used to represent organizational charts and/or to identify departments within an organization that owns the data stored in the classified table 120. The label components 202 are stored in the label set 118, for example, or stored in a database system catalog if the access control system 115 is to be implemented in DBMS 114.

FIG. 3 shows the classified table 120 of FIG. 1. A classified table is a database table that comprises labeled data rows. When a database administrator marks the classified table 120 as classified, the database administrator specifies the label set 118 to be used or associated with the classified table 120. The label set 118 determines the structure of the label components 202 to be used to label the data rows of the classified table 120. The label set 118 further determines the label access rules (tests 124) to be used for enforcing access to the classified table 120.

The classified table 120 comprises one or more classified data elements 303. The classified table 120 further comprises one or more row labels 306, one or more row labels 308, and one or more row labels 310. Each of the row labels 306, row labels 308, and row labels 310 are associated with a data element PLAN_A, PLAN_B, PLAN_C, and PLAN_D, respectively, and are indicated in respective table row 312, table row 314, table row 316, and table row 318. The access control system 115 generates and assigns security access labels; i.e., access labels and row labels A row label is assigned to each data element stored in the classified table 120. The data element may be a picture, a test document, or combination thereof. It is understood that each row has its own row label (there cannot be duplicate row labels). It is possible that two rows in the classified table 120 may have two row labels that are identical.

The classified table 120 is a convenient organized storage of a plurality of data elements used to illustrate one embodiment. The row label contains components that are used to express or indicate the access requirements of a data element. For example, row label of PLAN_A (see table row 312) comprises security label components LEVEL=TOP SECRET, COMPARTMENT=ARMY, OWNER=MARINES.

For example, for PLAN_A of table row 312, if a user is a member of MARINES division of ARMY and that user has a classification clearance of at least TOP SECRET or better, that user may have read and/or write access to PLAN_A. However, if that user is not a member of MARINES division but is instead a member of any other division of ARMY and that user also has a classification level of at least TOP SECRET or better, then that user may have only read access to PLAN_A. For any other condition, that user may not have read or write access to PLAN_A.

For example, for PLAN_B of table row 314, if a user is a member of RESEARCH division of NASA and that user also has a classification clearance of at least SECRET or better, that user may have read and write access to PLAN_B. However, if that user is not a member of RESEARCH division of NASA but that user is a member of some other NASA division and that user has a classification level of at least SECRET or better, that user may have only read access to PLAN_B. For any other condition, that user may not have read or write access to PLAN_B.

DBMS 114 may comprise a function that allows database users to refer to the security label associated with a row in a classified table in SQL statements. This function may, for example, be called "ROWLABEL". ROWLABEL can be referenced in an SQL statement. ROWLABEL allows users to reference a row label in SQL statements for manipulating data contained in the rows of the classified table 120.

For SELECT statements and WHERE clauses (to be included in an SQL statement), individual label components are referenced by providing the component name as a parameter to the ROWLABEL function. For example, a user who wishes to select only the level component of a label can issue the following SQL statement:

SELECT ROWLABEL(level), . . . , FROM T1

If the user wishes to express a predicate, the following SQL statement can be issued:

SELECT ROWLABEL(level), . . . , FROM T1 WHERE ROWLABEL(level)='Secret'

For INSERT and UPDATE SQL statements, ROWLABEL is a means of providing the label value of a data row. For example, a user who wishes to insert a row into a classified table can issue the following SQL statement:

INSERT INTO T1 VALUES (ROWLABEL('SECRET', 'NATO'), . . . )

A user who wishes to update the level component in the label of some data row can issue the following SQL statement:

UPDATE T1 SET ROWLABEL(level)=ROWLABEL ('SECRET') WHERE C1=5

FIG. 4 shows the user access table 122 of FIG. 1. The user access table 122 comprises security access labels (having component 406, component 408, and component 410) associated with user identifiers (column 402). An access label is assigned to each user. It is possible that users may have identical access labels. Access labels may be granted and revoked by the database administrator (that is, an executive level user of the access control system 115) or by another database user who has sufficient authority to act as an administrator. Access labels may be stored, for example, in a database catalog. The access label comprises components that express or indicate user ability to access data elements stored in the classified table 120 as predetermined by the administrator.

For example, user WALID (row 412) has a LEVEL=TOP SECRET (that is, Walid has top secret classification clearance). For WALID, COMPARTMENT=ARMY and NASA (that is, user Walid is a member of the ARMY and a member of NASA). Also, user Walid is indicated as an owner of documents that belong to the MARINES (a division of ARMY). These values indicate that user Walid may have only read and/or write access to data elements associated with a security label component MARINES provided that user Walid has the proper security clearance level (in this case, the security clearance of user Walid is TOP SECRET). Furthermore, user Walid may have only read access to any data element associated with a security label component ARMY or NASA, provided that user Walid has the proper security clearance level (in this case, the security clearance of user Walid is TOP SECRET).

For example, if a data element is associated with a clearance LEVEL that is greater than TOP SECRET (and associated with ARMY or NASA), user Walid may not have read access to that data element because the classification LEVEL of user Walid is not sufficient.

User BIRD (row 414) may have read and/or write access to any data elements that are associated with RESEARCH division of NASA provided the LEVEL classification of user Bird is sufficient to permit user BIRD access to those data element.

User BIRD may have only read access to data elements associated with NASA that do not belong with the RESEARCH division of NASA (provided that the LEVEL classification of user Bird is sufficient to permit user BIRD read access to those sorts of data elements).

FIG. 5 shows the tests 124 of FIG. 1. The tests 124 are to be selected and the label set 118 may also specify the access rules or tests that the access control system 115 uses to determine whether a user who is associated with an access label (i.e., access label_1) may have access to a data element associated with a row label (i.e., row label_1).

Label access rules may be divided categories such as read access rules and write access rules. The read access rules are used by the access control system 115 when a user attempts to read a data element from the classified table 120 (for example, when the user submits a SELECT statement to the DBMS 114). The access control system 115 uses the write access rules when a user attempts to write (such as, performing an insert, an update or a delete command) a data element. A label access rule may be a predicate that combines the same label components contained in an access label and a row label by using an operator as follows (for example):

Access Label Component_A <operator> Row Label Component_A

The type of operator to be used in the label access rules may depend on the type of label component. For ordered sets of label components, the operator may be any of the following relational operators $\{=, <=, <, >, >=, !=\}$. For non-ordered sets of label components, the operator may be, for example, any one of the set operators $\{IN, INTERSECT$. For trees of label components, the operator may be, for example, the INTERSECT set operator. The label set 118 and label access rules may be stored in a database system catalogs when the access control system 115 is integrated with the DBMS 114.

Exceptions to the label access rules here provide a flexibility to bypass one or more label access rules. For example, in an MLS context, it is often the case that some special users are allowed to write information to data elements associated with lower security levels even though this is in contradiction with the *-security property. Thus, exceptions are introduced to allow the database administrator to grant a database user an exception to bypass one or more rules associated with a particular label set.

Figure 6A:
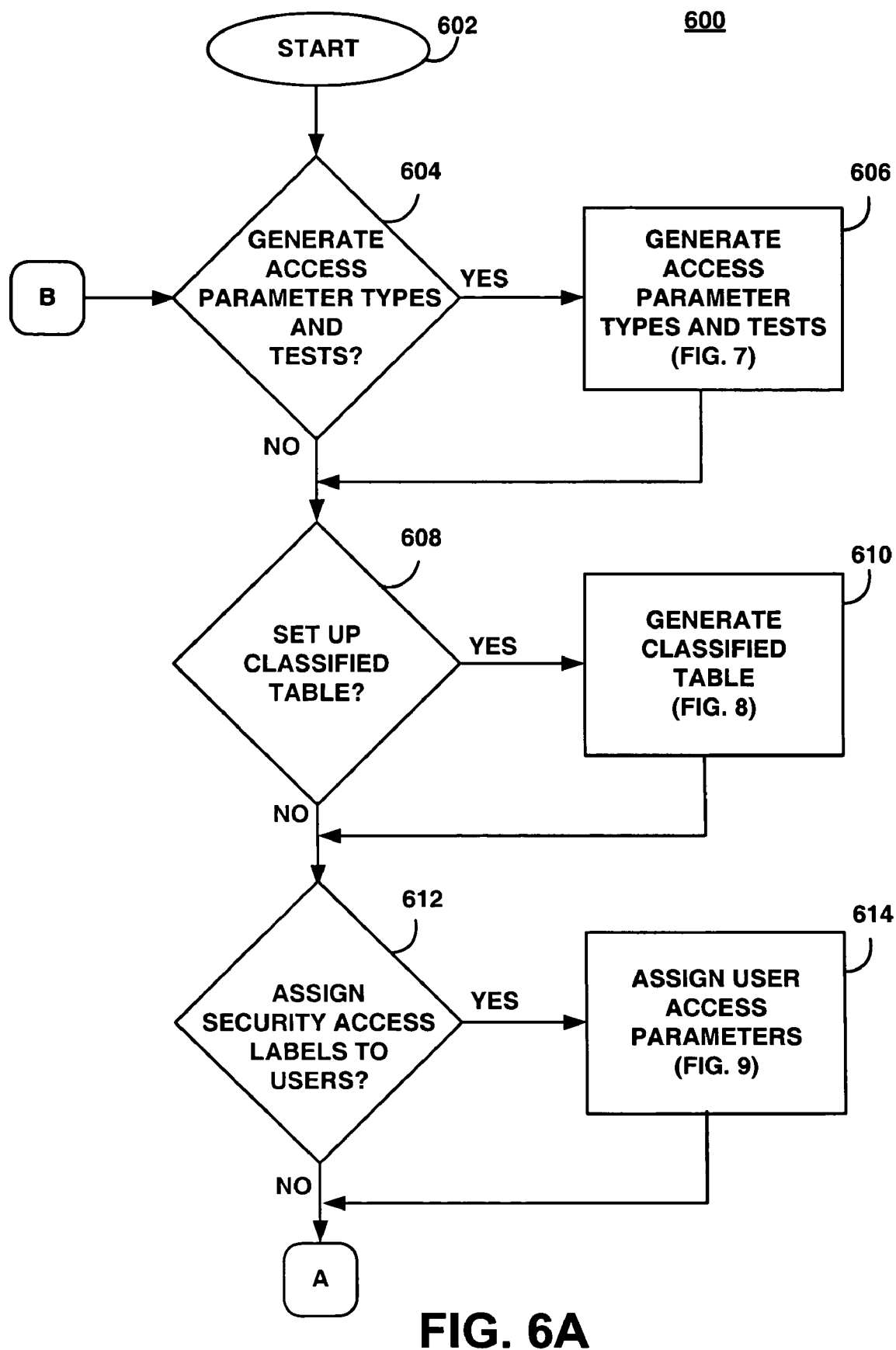
FIG. 6 is a process flow chart illustrating a method of operation of the access control system of FIG. 1, in which the operation comprises determining user requirements.
Figure 6B:
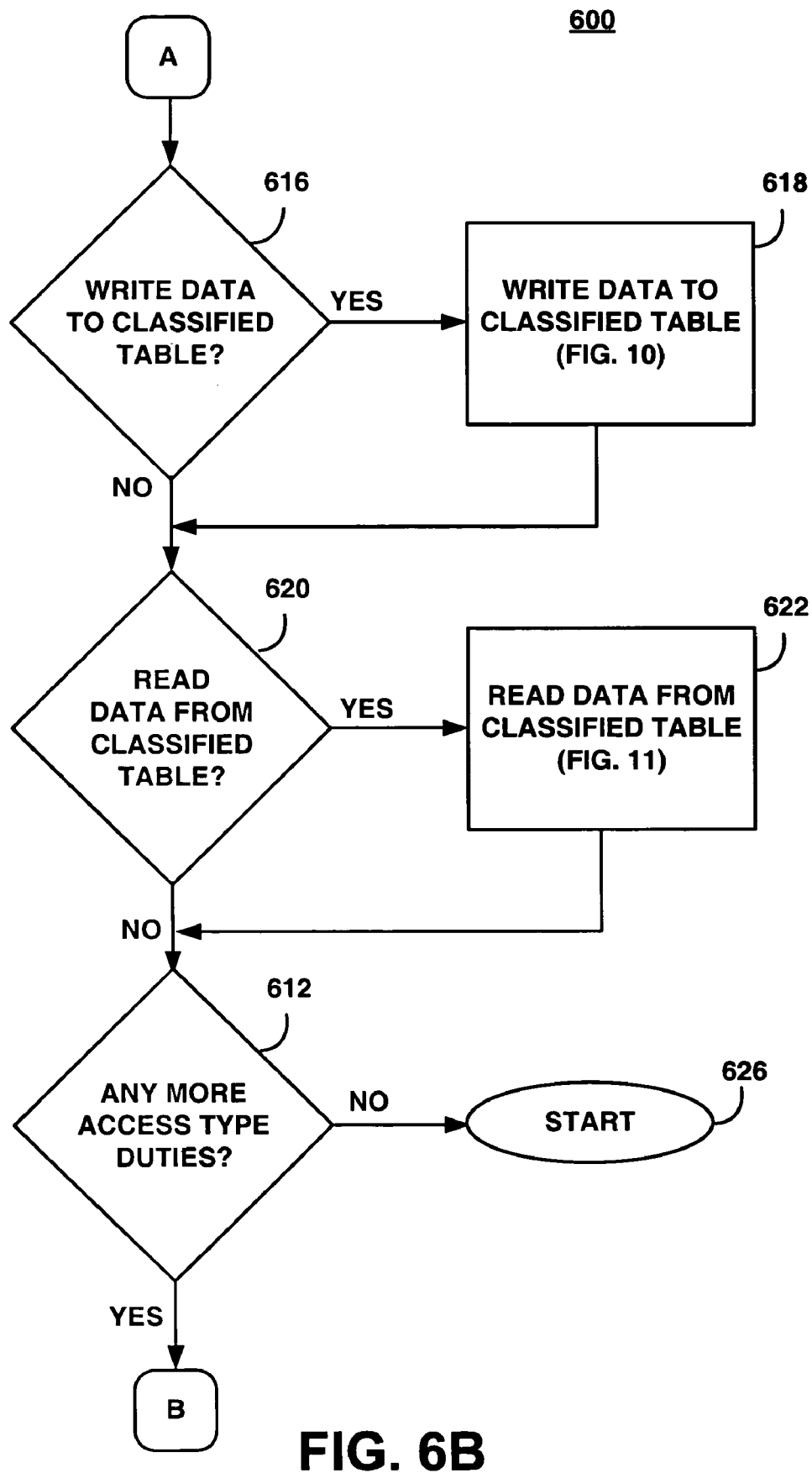

FIG. 6 illustrates a method 600 of operation of the access control system 115 of FIG. 1, in which the method 600 comprises determining user commands and requirements. The access control system 115 of FIG. 1 begins operation at step 602.

The access control system 115 determines whether the user desires to create the label set 118 of FIG. 2 or create the tests 124 of FIG. 5 (decision step 604). If the user desires to create label set 118 or tests 124, the access control system 115 creates access parameter types and tests (step 606). If the user does not desire to create label set 118 or tests 124, operation continues to decision step 608.

The access control system 115 determines whether the user desires to create the classified table 120 of FIG. 3 (decision step 608). If the user desires to create the classified table 120, the access control system 115 creates the classified table 120 (step 610). If the user does not desire to create the classified table 120, operation continues to decision step 612.

The access control system 115 determines whether the user desires to assign security access labels to users as shown in user access table 122 of FIG. 4 (decision step 612). If the user desires to assign security access labels, the access control system 115 assigns user access parameters (step 614). If the user does not desire to assign security access labels, operation continues to decision step 616.

The access control system 115 determines whether the user desires to write data to classified table 120 of FIG. 3 (decision step 616). If the user desires to write data to classified table 120, the access control system 115 writes data to the classified table 120 (step 618). If the user does not desire to write data to classified table 120, operation continues to decision step 620.

The access control system 115 determines whether the user desires read data (that is, data elements 303) from the classified table 120 of FIG. 3 (decision step 620). If the user desires to read data from the classified table 120, the access control system reads data from the classified table (step 622). If the user does not desire to read data from the classified table 120, operation continues to decision step 624.

The access control system 115 determines whether the user desires to re-perform any of operations of decision step 604, decision step 608, decision step 612, decision step 616, or decision step 620 (decision step 624). If the user desires to re-perform any of these operations, the access control system 115 returns to decision step 604 and repeats steps 604 through 622 as required. If the user does not desire to perform these operations, access control system 115 halts any further operations (step 626).

Figure 7:
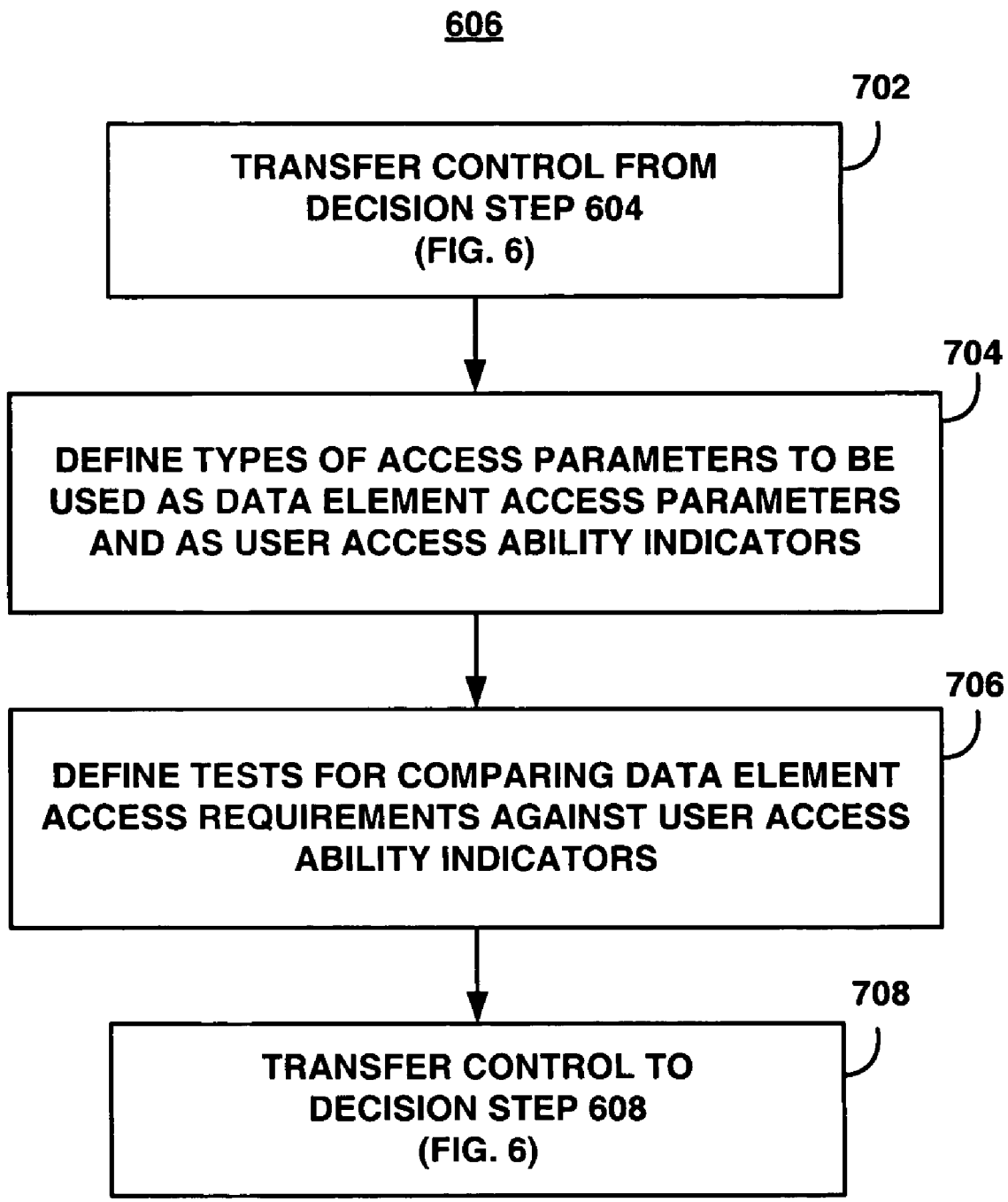
FIG. 7 is a process flow chart illustrating a method of operation of the access control system of FIG. 1, in which the operation comprises defining access parameter types and associated tests.

FIG. 7 illustrates a method of operation of step 606 of the method 600 of the access control system 115 of FIG. 1. Step 606 comprises defining the label set 118 of FIG. 2. The label set 118 is a set of types of access components. Step 606 further comprises defining the label access rules (tests 124 of FIG. 5) to be associated with the label set 118.

The access control system 115 helps the database administrator (an executive user of the access control system 115) to define the security label components (indicated in row 202 of label set 118) and their types. For example, the access control system 115 permits the database administrator to define security a label component referenced as LEVEL (of type integer) and a label component referenced as COMPARTMENT (of type string).

The access control system 115 permits the database administrator to define the label set that comprises the security label component 202. The relationship between the security label component 202 and the label set 118 is analogous to the relationship between a data row of a table and a table schema. As the table schema defines the set of columns that make up a data row, so the label set 118 set defines the set of security label components that make up the label set 118. The label set 118 may also be associated with a test table, tests 124 of FIG. 5. The test table, tests 124, comprises a set of access rules that the access control system 115 uses to determine whether a user who is associated with a security access label, L_1, may or may not access a data row associated with a security label, L_2. The label access rules may be divided into categories such as read access rules and write access rules.

The access control system 115 transfers control from decision step 606 of FIG. 6 because a user has indicated a desire to define the components to be included in the label set 118 of FIG. 2 and the tests 124 of FIG. 5 (step 702).

The access control system 115 defines the components of label set 118 of FIG. 2 (step 704). The components 202 of label set 118 indicate the types of access parameters 306, 208, 310 to be associated with data elements 303 of FIG. 3.

The access control system 115 defines the tests 124 of FIG. 5 to be associated with the components 202 of label set 118 (step 706). The access control system transfers control back to decision step 608 of FIG. 6.

Figure 8:
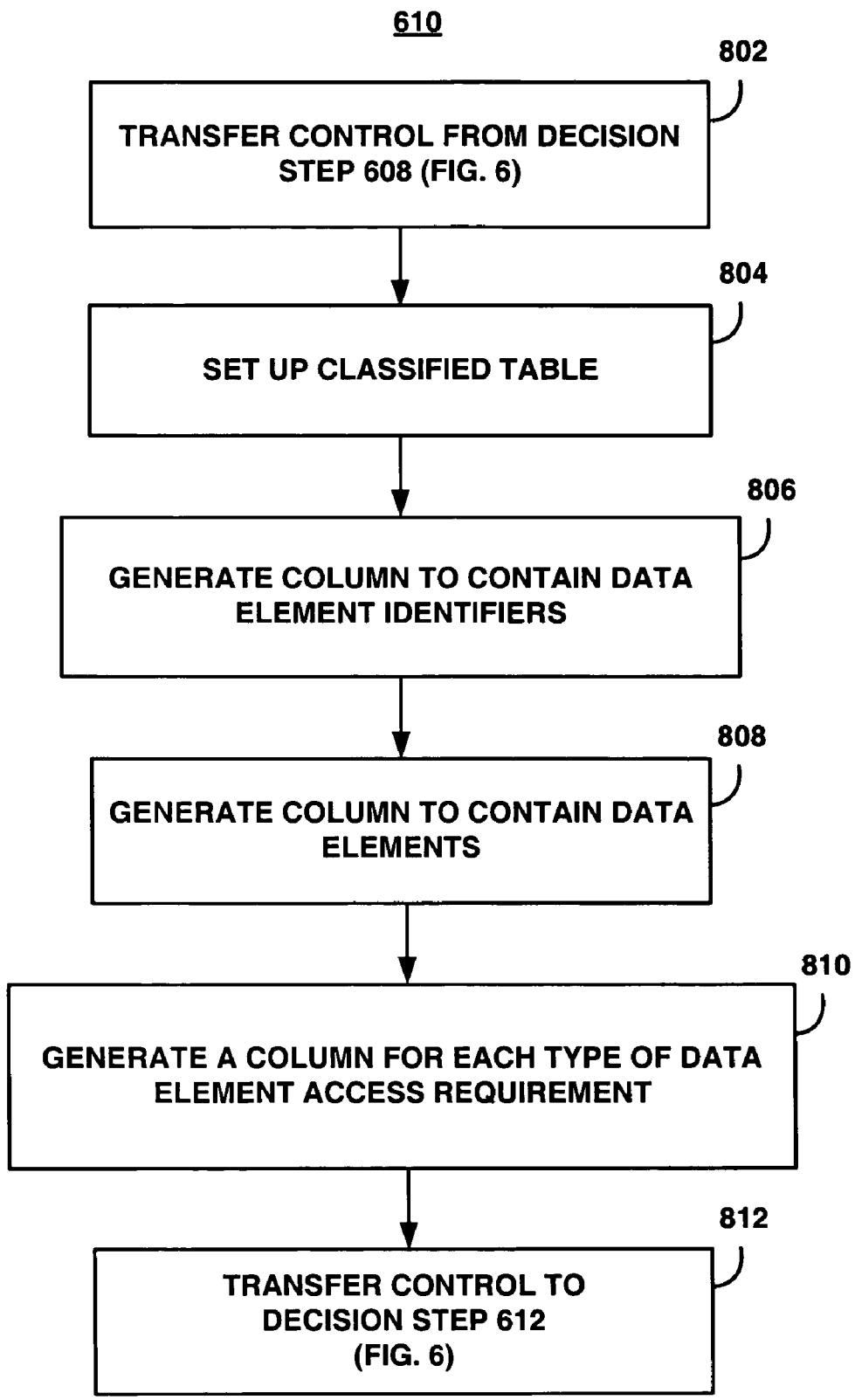
FIG. 8 is a process flow chart illustrating a method of operation of the access control system of FIG. 1, in which the operation comprises creating a table contained in the database of FIG. 1.

FIG. 8 illustrates a method of operation of step 610 of the method 600 of the access control system 115 of FIG. 1. Step 610 comprises creating the classified table 120 of FIG. 1.

A database administrator (an executive user of the access control system 115) attaches the label set 118 to the classified table 120. When the label set 118 is attached to the classified table 120, the table 120 is considered classified; i.e., the data elements may only be accessed depending on the execution outcome of the tests 124 of FIG. 5.

When the user desires to access data elements contained in the classified table 120, the access control system 115 applies the access rules defined and associated with the label set 118 of FIG. 2. The label set 118 is attached to the classified table 120 to determine whether or not a user may have or may not have access to a row containing a data element within the classified table 120.

The access control system 115 transfers control from decision step 610 of FIG. 6 because a user has indicated a desire to create the classified table 120 of FIG. 3 (step 802). The access control system 115 sets up the classified table 120 (step 804).

The access control system 115 generates a column 302 to contain the data element identifiers (step 806). Each of these identifiers identifies a specific data element contained in table 120. The access control system 115 generates a column 303 to contain the data elements (step 808).

The access control system 115 generates a column for each row label component 306, 308 and 310 (that is, each user Access Label component 306,108, 310) (step 810). Each component 306, 308, 310 indicates the data element access requirements to be compared against user access label components at a later time (the comparison is further described below). The access control system transfers control back to decision step 612 of FIG. 6 (step 812).

Figure 9:
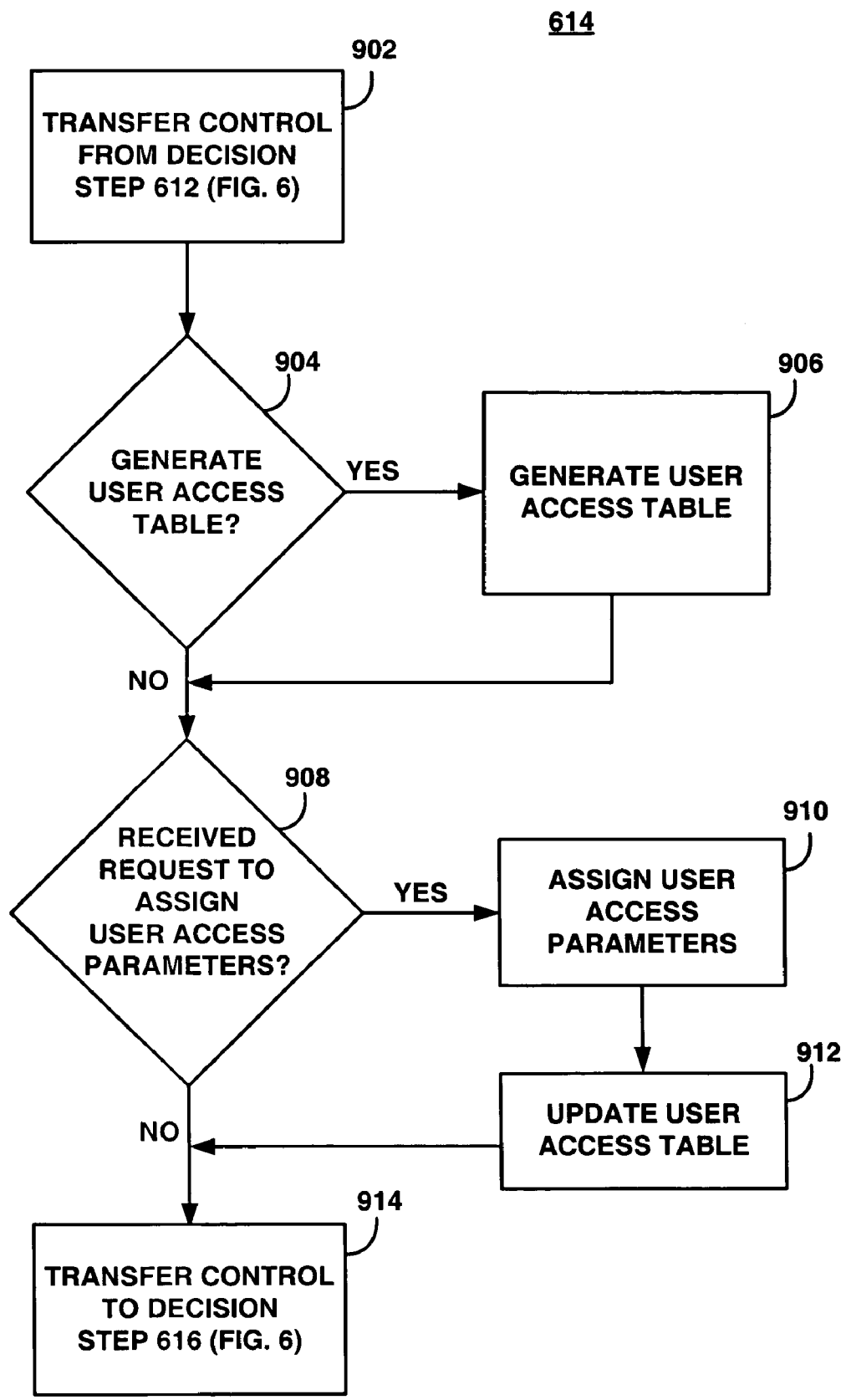
FIG. 9 is a process flow chart illustrating a method of operation of the access control system of FIG. 1, in which the operation comprises assigning user access parameters.

FIG. 9 illustrates a method of operation of step 614 of the method 600 of the access control system 115 of FIG. 1. Step 614 comprises assigning user access labels to users. Each access label (security Access Label) comprises user access components, each component indicating an ability of a user to access data elements stored in the classified table 120 of FIG. 3.

The access control system 115 permits a database administrator (who is an executive level user of the access control system 115) to grant access labels (security Access Labels) to specific database users. The access control system 115 uses the access labels in conjunction with the label set access rules to determine user access rights with respect to rows (that is, data elements associated with a row) contained in the classified table 120. The access control system 115 may permit the database administrator to choose to grant one or more exceptions to a database user to allow them to bypass one or more access rules associated with the label set 118.

The access control system 115 may be integrated into an SQL (Structured Query Language) compiler component (not illustrated) of the DBMS 114 such that when an SQL query references the classified table 120, the SQL compiler incorporates the access rules of the label set associated with the classified table 120 in an access plan. The SQL compiler generates the access plan). The access plan is used to execute the compiled user SQL query. When the access plan is executed, the access rules may be evaluated for each row (that contains the data element) in the classified table 120 to determine whether access to a specific row should be allowed or disallowed.

The access control system 115 transfers control from decision step 614 of FIG. 6 because a database administrator indicated a desire to assign user access parameters to a user (step 902).

The access control system 115 determines whether the user request is a request to generate the user access table 122 (decision step 904). If the user request indicates a desire to generate the user access table 122, the user access table 122 is generated (step 906) and processing continues to decision step 908. If the user request indicates no desire to generate the user access table 122, processing continues to operation decision step 908.

The access control system 115 determines whether the received user request indicates a desire to assign access labels (security Access Labels) to a specific user (decision step 908). If it is determined that the user wishes to assign an access label to the specific user, the access control system assigns an access label to a user (step 910) and components of the access label are selected or filled in for the access label assigned to the specific user (step 912). If it is determined that the user does not wish to assign an access label to the specific user, the access control system 115 transfers control to decision step 616 of FIG. 6.

Figure 10A:
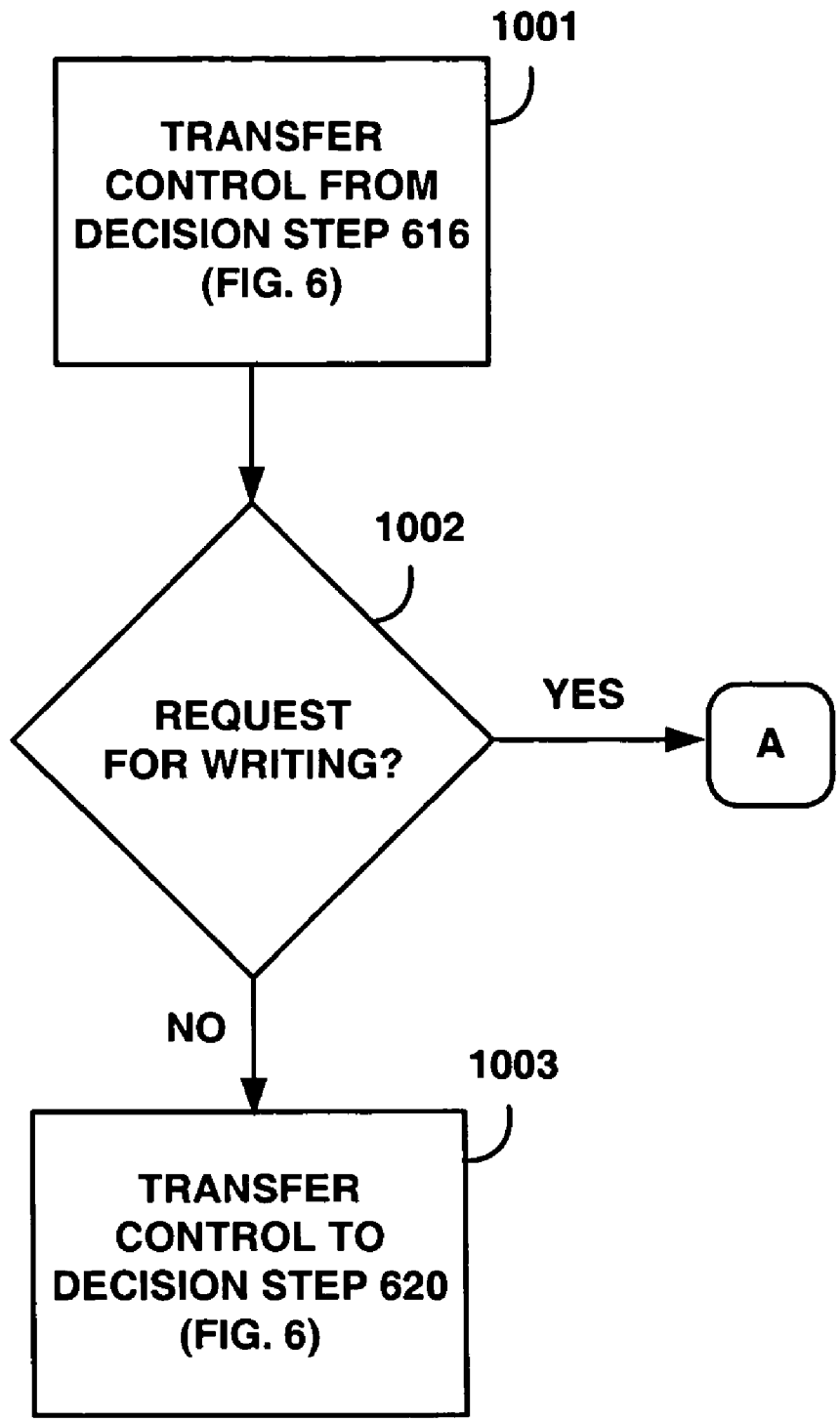
FIG. 10 is a process flow chart illustrating a method of operation of the access control system of FIG. 1, in which the operation comprises writing data to a table contained in the database of FIG. 1.
Figure 10B:
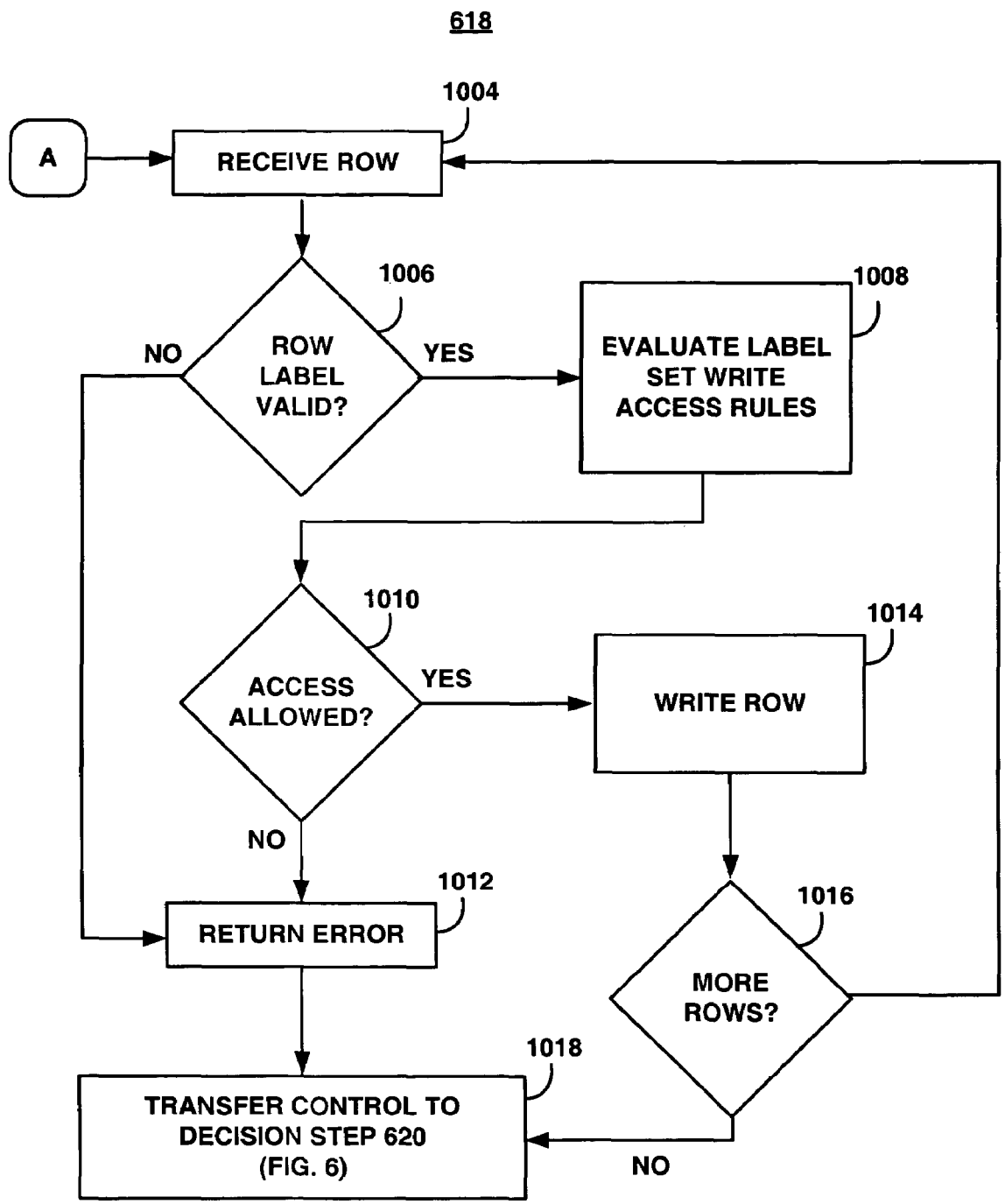

FIG. 10 illustrates a method of operation of step 618 of the method 600 of the access control system 115 of FIG. 1. Step 618 comprises writing data elements to the classified table 120 of FIG. 1. The access control system transfers control from decision step 618 of FIG. 6 step 1001).

The access control system 115 determines whether the access control system 115 received a user request for writing (that is, a write access command) data to a data element stored in the classified table 120 (decision step 1002). If the user request is not a write request, the access control system returns to step 616 of FIG. 6. If the user request indicates a write access request, the access control system 115 proceeds to step 1004. The access control system 115 receives a row to be written (step 1004).

The access control system 115 validates row security label components associated with the row (that is, the data element) to be written to the classified table 120 (decision step 1006). If the row security label components are not valid the access control system returns an error to the user (step 1012) and then transfers control to decision step 620 of FIG. 6 (step 1018). The row security label components are not valid if the row security label components are not composed of the exact same components defined in the label set associated with the classified table 120 or if the values of each row security label component are not valid with respect to their type.

If the row security label components are valid (decision step 1006), the access control system evaluates write access rules associated with the label set of the classified table 120 (step 1008).

The access control system 115 determines whether the access may be allowed (decision step 1010). If it is determined that access may be allowed, the access control system 115 writes the row into the classified table 120 (step 1014). If it is determined that access may not be granted or not be allowed, the access control system 115 returns an error indication to the user (step 1012) and returns to decision step 620 of FIG. 6 (step 1018).

The access control system 115 determines whether there are more rows to process (decision step 1016). If it is determined that more rows are to be processed, the access control system returns to step 1004 and repeats step 1004 through step 1010 for the next row received. If it is determined that there are no more rows to be written to the classified table 120, the access control system returns to decision step 620 of FIG. 6 (step 1018).

Figure 11A:
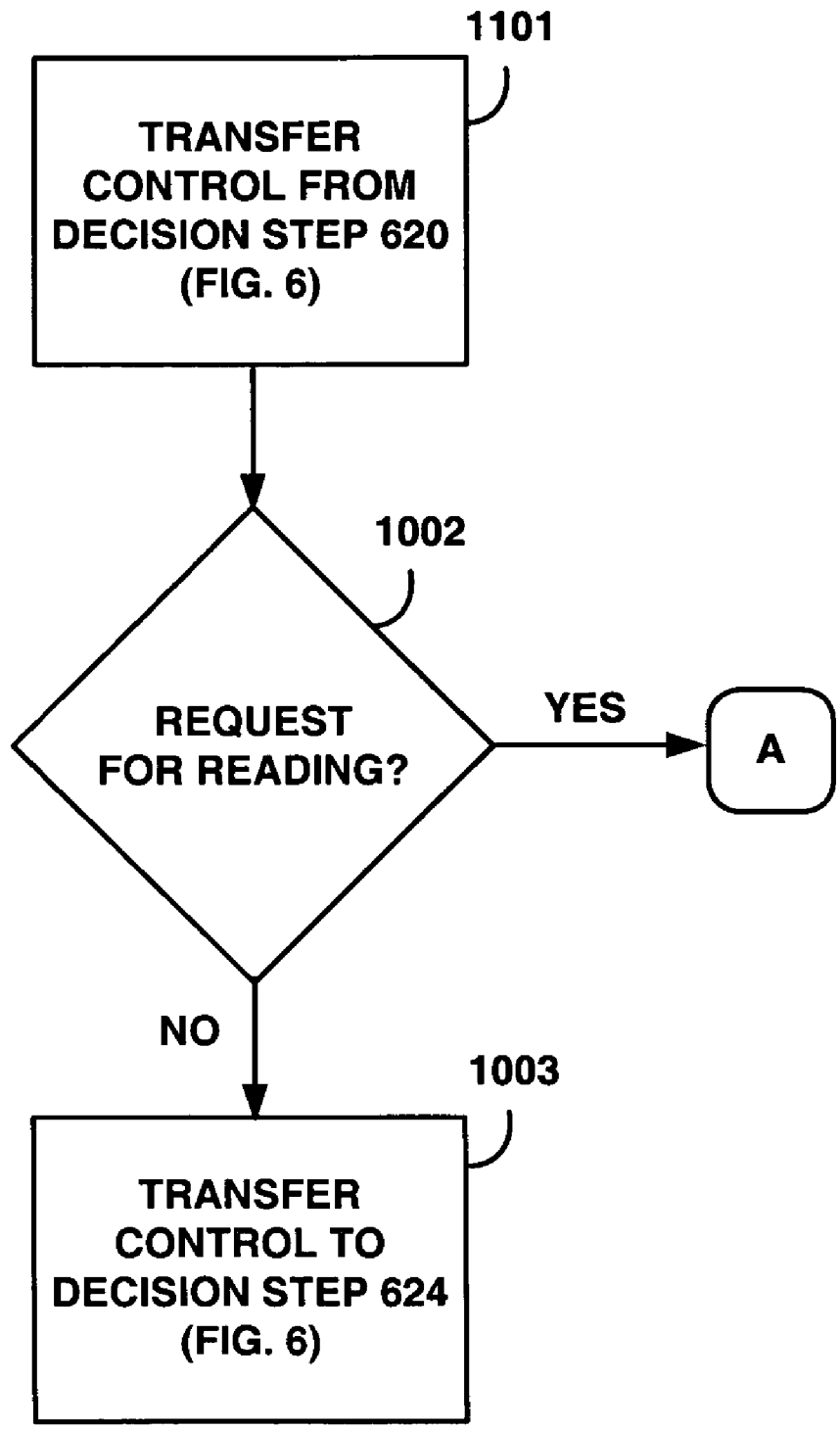
FIG. 11 is a process flow chart illustrating a method of operation of the access control system of FIG. 1, in which the operation comprises reading data from a table contained in the database of FIG. 1.
Figure 11B:
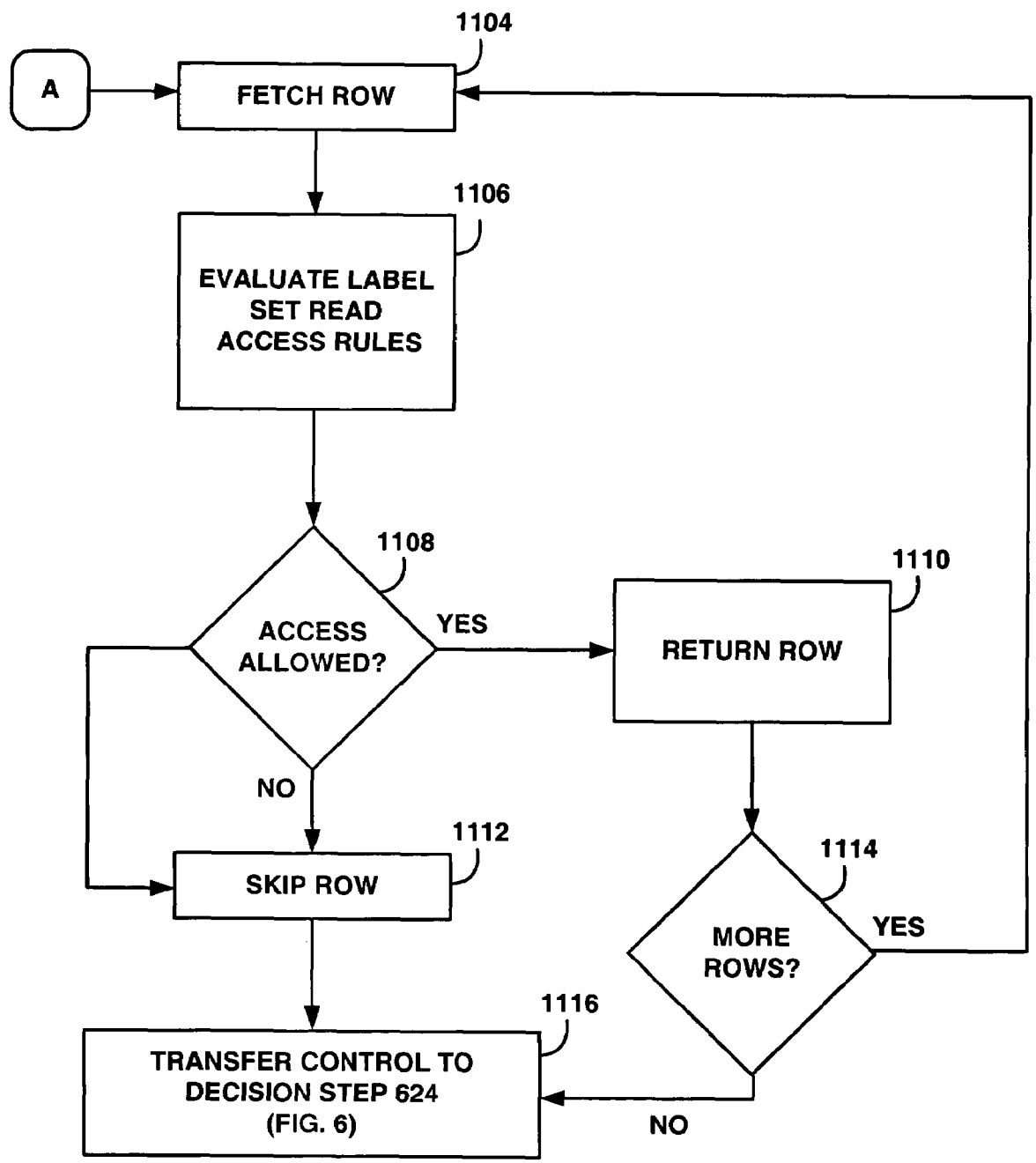

FIG. 11 illustrates a method of operation of step 622 of method 600 of the access control system 115 of FIG. 1. Step 622 comprises reading one or more rows that were written into the classified table 120 of FIG. 1. The access control system 115 transfers control from decision step 622 of FIG. 6 (step 1101)

The access control system 115 determines the type of access request requested by a user (decision step 1102). If the type of user access being requested is a read access, the access control system 115 proceeds to step 1104. If the type of user access being requested is not a read access, operation is transferred to decision step 624 of FIG. 6.

The access control system 115 fetches the next row in the classified table 120 (step 1104). The access control system 115 evaluates the read access rules associated with the label set 118 (step 1106).

The access control system 115 determines whether user access may be granted or allowed (decision step 1108). If the determination is made that user access may be allowed, the access control system 115 returns the fetched row to the user (step 110). If the determination is made that the user may not be allowed or may not be granted access, the access control system 115 skips the fetched row (i.e., the fetched row is not returned to the user) (step 1112).

The access control system 115 determines whether there are any more rows in the classified table 120 to be fetched. If there are no more rows to be fetched, the access control system 115 returns to decision step 624 of FIG. 6. If there are more rows to be fetched, the access control system 115 returns to step 1104 in which case the next row in the classified table 120 is fetched and step 1104 to step 1114 may be repeated as needed.

In one embodiment, the access control system 115 uses security access labels to provide fine-grained access control in the DBMS of FIG. 1. Generally, fine-grained access control refers to a method of providing row-level security for a table as known to those skilled in the art. In private banking, country laws and regulations often require limitation of the amount of data that can be viewed by a bank employee. For example, Swiss banking laws do not allow a Swiss bank employee located in Toronto to access account information for customers based in Switzerland. A bank employee can only access account information for customers who are based in the same location as the bank employee.

Typically, the bank addresses this access control problem as follows. When a bank employee is authenticated, a security context is assigned to him/her based on the authentication type, location, geography, etc. When that bank employee issues a request, the request goes through a number of systems up to a mainframe system where an application picks it up and adds an appropriate predicate based on the employee location (e.g., WHERE location="Toronto") before it is submitted to the DBMS. This solution is error prone and exposes security policies directly to the application programmers. It also requires many code reviews to ensure correctness.

The problem stated above can be easily solved using the control access system 115 by associating a label with each customer account that specifies its location and by associating a label with each bank employee that specifies where that employee is located. The DBMS can then ensure that bank employees can only access account information for the customers located in their geographical location.

Referring to FIG. 7, the following SQL statement creates a label component called location:

CREATE LABEL COMPONENT location OF TYPE varchar(15)
    USING SET ("Zurich", "Toronto", "London", "Paris")

The following SQL statement creates a label set based on the component defined above:

CREATE LABEL SET set1 COMPONENTS location
    READ ACCESS RULE rule1 ACCESS LABEL location IN ROW LABEL location
    WRITE ACCESS RULE rule2 ROW LABEL location IN ACCESS LABEL location Referring to FIG. 8, the following SQL statement creates a classified table T1 to store customer account information and associates this table with label set set1:

CREATE Table T1 (CustomerID int, CustomerName char(30), CustomerBalance)
    LABEL SET set1

Referring to FIG. 9, the following SQL statements create two access labels and grant them to bank employee empA and empB:

CREATE ACCESS LABEL label1 IN LABEL SET set1 Location "Toronto"
    CREATE ACCESS LABEL label2 IN LABEL SET set1 Location "Zurich"
    GRANT LABEL label1 FOR USER empA FOR ALL
    GRANT LABEL label2 FOR USER empB FOR ALL Referring to FIG. 10, when a user issues an SQL statement against the classified table T1 that reads or modifies a data row, the label access rules defined above are evaluated to determine whether or not the user can read/modify the data row. Below are exemplary INSERT SQL statement examples for user empA.

| SQL Command | Status |
|---|---|
| INSERT INTO T1 VALUES (1, 'Hans',100, ROWLABEL ('Zurich')) | This command is rejected because user empA is not allowed to write account information for customers located in Zurich (rule2). |
| INSERT INTO T1 VALUES (2, 'PBIRD',100,ROWLABEL ('Toronto')) | This command is accepted because rule2 is satisfied. |
| INSERT INTO T1 VALUES (3,'WRJAIBI',10,ROWLABEL ('Toronto') | This command is accepted because rule2 is satisfied. |

Below are exemplary INSERT SQL statement examples for user empB:

| SQL Command | Status |
|---|---|
| INSERT INTO T1 VALUES (1,'Hans',100, ROWLABEL ('Zurich')) | This command is accepted because rule2 is satisfied. |
| INSERT INTO T1 VALUES (4,'Urs',100, ROWLABEL ('Zurich')) | This command is accepted because rule2 is satisfied. |

Referring to FIG. 11, the following are exemplary SELECT SQL statement examples for user empA.

| SQL Command | Status |
|---|---|
| SELECT * FROM T1 | This command returns only rows PBIRD and WRJAIBI. The other 2 rows are not returned because rule 1 is not satisfied. |

The following are exemplary SELECT SQL statement examples for user empB.

| SQL Command | Status |
|---|---|
| SELECT * FROM T1 | This command returns only rows Hans and Urs. The other 2 rows are not returned because rule 1 is not satisfied. |

In the example described above, Urs is a first name commonly used in the German part of Switzerland. In this case, the access control system 115 is inserting a record for the customer called Urs.

In a further example, a bank executive (exec1) located in Zurich holds access label label1 and is permitted read access to account information for customers located in Toronto. The administrator can grant a label exception to this executive to bypass rule 1 as follows:

GRANT LABEL EXCEPTION ON RULE rule1 IN set1 TO USER exec1

If the executive issues the SELECT * FROM T1 query, he/she will be able to see all the rows above.

In a further embodiment, the access control system 115 uses security access labels for providing MLS capability in the DBMS 114 of FIG. 1. An application wishes the DBMS 114 to provide MLS semantics. In MLS, a label comprises two components: a hierarchical component a set of unordered compartments. The hierarchical component is referenced as a level. In an example, the valid values a level comprises are Top Secret, Secret, Classified, and Unclassified. Similarly, a compartment can take any of the following values: NATO, Nuclear and Army.

Referring to FIG. 7, the following two SQL statements can be used to create the two components.

CREATE LABEL COMPONENT level OF TYPE varchar(15)
USING ORDERED SET ("TOP SECRET", "SECRET", "CLASSIFIED", "UNCLASSIFIED")
CREATE LABEL COMPONENT compartments OF TYPE varchar(15)
USING SET ("NATO", "Nuclear", "Army")

The keyword ORDERED in the definition of the first component indicates that the order in which the elements appear in the set is significant.

Referring to FIG. 7, the access control system 115 uses the following SQL statement to create a label set 118 where each label is composed of the two components defined above. The statement also permits the access control system 115 to specify the label access rules. These label access rules implement the simple security property and the *-property previously described.

CREATE LABEL SET set1 COMPONENTS level, compartments
READ ACCESS RULE rule1 ACCESS LABEL level>=ROW LABEL level
READ ACCESS RULE rule2 ROW LABEL compartments IN ACCESS LABEL compartments
WRITE ACCESS RULE rule3 ROW LABEL level>=ACCESS LABEL level
WRITE ACCESS RULE rule4 ACCESS LABEL compartments IN ROW LABEL compartments Referring to FIG. 8, the application wishes to create a table where each data row is to be labeled using a label from set1 above. The access control system can use the following SQL statement can be used to generate such a table.

CREATE Table T1 (C1 char(3), C2 int)
LABEL SET set1

Referring to FIG. 9, the access control system 115 generates the access labels and assigns the access labels to database users using the following SQL statements:

CREATE ACCESS LABEL label1 IN LABEL SET set1 Level "TOP SECRET", compartments "Nuclear"
CREATE ACCESS LABEL label2 IN LABEL SET set1 Level "CLASSIFIED", compartments "Army"
GRANT LABEL label1 FOR USER walid FOR ALL
GRANT LABEL label2 FOR USER paul FOR ALL Referring to FIG. 10, when a user issues an SQL statement against the classified table T1 that reads or modifies a data row, the label access rules defined above are evaluated to determine whether or not the user can read/modify the data row. Below are exemplary INSERT SQL statements for user walid.

| SQL Command | Status |
| --- | --- |
| INSERT INTO T1 VALUES ('abc',1,ROWLABEL('TOP SECRET', 'NATO')) | This command is rejected because the compartment of user walid (Nuclear) is not included in the compartments of the row being inserted (rule4). |
| INSERT INTO T1 VALUES ('def',2,ROWLABEL('TOP SECRET', 'Nuclear')) | This command is accepted because both rule3 and rule4 are satisfied. |
| INSERT INTO T1 VALUES ('ghi',3,ROWLABEL ('UNCLASSIFIED','Nuclear')) | This command is rejected because user walid is attempting to write a row at a lower security level (level 3). |

Below are exemplary INSERT SQL statements for user paul.

| SQL Command | Status |
| --- | --- |
| INSERT INTO T1 VALUES ('jkl',4,ROWLABEL ('CLASSIFIED','Army')) | This command is accepted because both rule3 and rule4 are satisfied. |
| INSERT INTO T1 VALUES ('mno',5,ROWLABEL ('SECRET','Army')) | This command is accepted because both rule3 and rule4 are satisfied |

Referring to FIG. 11, the following are exemplary SELECT SQL statements for user walid.

| SQL Command | Status |
| --- | --- |
| SELECT * FROM T1 | This command returns only row: ('def',2,{'TOP SECRET', 'Nuclear'}). The other 2 rows are not returned because rule 2 is not satisfied. |

The following are exemplary SELECT SQL statements for user paul.

| SQL Command | Status |
| --- | --- |
| SELECT * FROM T1 | This command returns only row: ('jkl',4,{'CLASSIFIED', 'Army'}). The other 2 rows are not returned because rule 1 is not satisfied. |

The access control system 115 may be included in a database management system (DBMS) 114 or information retrieval system (IRS). Further, the access control system may be included in many types of software applications, such as, for example (the following represents a non-exhaustive list of such applications):

a DBMS adapted to provide fine-grained access control to database table rows;
a DBMS adapted to provide MLS;
a DBMS adapted to enforce privacy policies;
an operating system (OS) stored in the memory of a DPS, the OS being adapted to implement a policy where access to systems files is based on security labels and label access rules;
a Publish/Subscribe system adapted to implement a policy where the matching process also take into account the security labels associated with a subscription and an event as well as the label access rules; and
an XML system adapted to control access to the nodes in an XML document based on the security labels and label access rules.

The access control system 115 is an improvement over known LBAC solutions in the sense that the access control system 115 is not restricted to MLS semantics. The access control system 115 may be used in various application domains and for various purposes. The access control system 115 may also be used to provide.

It is to be understood that while specific embodiments have been described to illustrate certain applications of the principle of the present invention. Other modifications are possible without departing from the spirit and scope of the present invention.

What is claimed is:

1. A computer-implemented method of controlling user access to stored data elements, comprising configuring one or more computer processors to perform an operation comprising:
    defining, based on user input, an ordered plurality of security levels that describe sensitivity of the stored data elements;
    defining, based on user input, a plurality of categories that categorize the stored data elements;
    associating each user with a security level from the ordered plurality of security levels and a category from the plurality of categories, thereby defining a security clearance for each respective user; and
    defining, based on user input and for each of the stored data elements, a read access rule for the respective stored data element, wherein the read access rule comprises a condition for granting read access to the respective stored data element, the condition specifying a security level of the plurality of security levels and a category from the plurality of categories.

2. The computer-implemented method of claim 1, wherein the operation further comprises:
    receiving a user request to access a stored data element;
    evaluating, by operation of the one or more computer processors, the read access rule for the stored data element to which access is requested; and
    selectively permitting read access to the stored data element in response to the access request, based on the evaluation result for the read access rule.

3. The computer-implemented method of claim 2, wherein the operation further comprises:
    defining, based on user input and for each of the stored data elements, a write access rule for the respective stored data element, wherein the write access rule comprises a condition for granting write access to the respective stored data element, the condition specifying a security level of the plurality of security levels and a category from the plurality of categories; wherein the condition for granting write access to one of the stored data elements differs from the condition for granting read access to the one of the stored data elements;
    evaluating, by operation of the one or more computer processors, the write access rule for the stored data element to which access is requested; and
    selectively permitting write access to the stored data element in response to the access request, based on the evaluation result for the write access rule.

4. The computer-implemented method of claim 3, wherein the condition for granting write access further specifies an exception for a user, whereby the exception allows write access to be granted to the user even if the condition is not satisfied.

5. The computer-implemented method of claim 3, wherein the condition of the write access rule is satisfied only if (i) the security level of the user meets the security level specified by the write access rule for the stored data element, and (ii) the category of the user matches the category specified by the write access rule for the stored data element.

6. The computer-implemented method of claim 1, wherein the condition for granting read access further specifies an exception for a user, whereby the exception allows read access to be granted to the user even if the condition is not satisfied.

7. The computer-implemented method of claim 1, wherein the condition of the read access rule is satisfied only if (i) the security level of the user meets the security level specified by the read access rule for the stored data element, and (ii) the category of the user matches the category specified by the read access rule for the stored data element.

8. A computer program product for controlling user access to stored data elements, the computer program product comprising a computer usable medium having computer usable program code configured to:
    define, based on user input, an ordered plurality of security levels that describe sensitivity of the stored data elements;
    define, based on user input, a plurality of categories that categorize the stored data elements;
    associate each user with a security level from the ordered plurality of security levels and a category from the plurality of categories, thereby defining a security clearance for each respective user;
    define, based on user input and for each of the stored data elements, a read access rule for the respective stored data element, wherein the read access rule comprises a condition for granting read access to the respective stored data element, the condition specifying a security level of the plurality of security levels and a category from the plurality of categories;
    receive a user request to access a stored data element;
    evaluate the read access rule for the stored data element to which access is requested; and
    selectively permit read access to the stored data element in response to the access request, based on the evaluation result for the read access rule.

9. The computer program product of claim 8, wherein the computer usable program code is further configured to:
    define, based on user input and for each of the stored data elements, a write access rule for the respective stored data element, wherein the write access rule comprises a condition for granting write access to the respective stored data element, the condition specifying a security level of the plurality of security levels and a category from the plurality of categories; wherein the condition for granting write access to one of the stored data elements differs from the condition for granting read access to the one of the stored data elements;
    evaluate the write access rule for the stored data element to which access is requested; and
    selectively permit write access to the stored data element in response to the access request, based on the evaluation result for the write access rule.

10. The computer program product of claim 9, wherein the condition for granting write access further specifies an exception for a user, whereby the exception allows write access to be granted to the user even if the condition is not satisfied.

11. The computer program product of claim 9, wherein the condition of the write access rule is satisfied only if (i) the security level of the user meets the security level specified by the write access rule for the stored data element, and (ii) the category of the user matches the category specified by the write access rule for the stored data element.

12. The computer program product of claim 8, wherein the condition for granting read access further specifies an exception for a user, whereby the exception allows read access to be granted to the user even if the condition is not satisfied.

13. The computer program product of claim 8, wherein the condition of the read access rule is satisfied only if (i) the security level of the user meets the security level specified by the read access rule for the stored data element, and (ii) the category of the user matches the category specified by the read access rule for the stored data element.

14. A system, comprising:

a processor; and a memory containing an access control program, which when executed by the processor is configured to perform an operation for controlling user access to stored data elements, comprising:

defining, based on user input, an ordered plurality of security levels that describe sensitivity of the stored data elements;

defining, based on user input, a plurality of categories that categorize the stored data elements;

associating each user with a security level from the ordered plurality of security levels and a category from the plurality of categories, thereby defining a security clearance for each respective user;

defining, based on user input and for each of the stored data elements, a read access rule for the respective stored data element, wherein the read access rule comprises a condition for granting read access to the respective stored data element, the condition specifying a security level of the plurality of security levels and a category from the plurality of categories;

receiving a user request to access a stored data element;

evaluating the read access rule for the stored data element to which access is requested; and selectively permitting read access to the stored data element in response to the access request, based on the evaluation result for the read access rule.

15. The system of claim 14, wherein the operation further comprises:

defining, based on user input and for each of the stored data elements, a write access rule for the respective stored data element, wherein the write access rule comprises a condition for granting write access to the respective stored data element, the condition specifying a security level of the plurality of security levels and a category from the plurality of categories; wherein the condition for granting write access to one of the stored data elements differs from the condition for granting read access to the one of the stored data elements;

evaluating the write access rule for the stored data element to which access is requested; and selectively permitting write access to the stored data element in response to the access request, based on the evaluation result for the write access rule.

16. The system of claim 15, wherein the condition for granting write access further specifies an exception for a user, whereby the exception allows write access to be granted to the user even if the condition is not satisfied.

17. The system of claim 15, wherein the condition of the write access rule is satisfied only if (i) the security level of the user meets the security level specified by the write access rule for the stored data element, and (ii) the category of the user matches the category specified by the write access rule for the stored data element.

18. The system of claim 14, wherein the condition for granting read access further specifies an exception for a user, whereby the exception allows read access to be granted to the user even if the condition is not satisfied.

19. The system of claim 14, wherein the condition of the read access rule is satisfied only if (i) the security level of the user meets the security level specified by the read access rule for the stored data element, and (ii) the category of the user matches the category specified by the read access rule for the stored data element.

* * * * *